US007267255B1

(12) United States Patent
Young et al.

(10) Patent No.: US 7,267,255 B1

(45) Date of Patent: Sep. 11, 2007

(54) WEB TRACKING ADJUSTMENT DEVICE AND METHOD THROUGH USE OF A BIASED GIMBAL

(75) Inventors: Timothy J. Young, Williamson, NY (US); Larry T. Schlitzer, Penfield, NY (US); Kevin E. Yousey, Brockport, NY (US); Kevin S. Reitter, Hamlin, NY (US)

(73) Assignee: Eastman Kodak Company, Rochester, NY (US)

( * ) Notice: Subject to any disclaimer, the term of this patent is extended or adjusted under 35 U.S.C. 154(b) by 1238 days.

(21) Appl. No.: 09/772,177

(22) Filed: Jan. 29, 2001

(51) Int. Cl.
*B23Q 15/00* (2006.01)

(52) U.S. Cl. ............................ 226/15; 226/18; 226/21; 226/170

(58) Field of Classification Search .................. 226/21, 226/180; 242/615.1, 615.2, 615.21, 615.3; 399/165, 395
See application file for complete search history.

(56) References Cited

U.S. PATENT DOCUMENTS

| | | | | |
|---|---|---|---|---|
| 3,608,796 | A * | 9/1971 | Morse et al. | 226/21 |
| 3,913,813 | A | 10/1975 | Morse | |
| 3,973,446 | A * | 8/1976 | Vasilantone | 226/21 X |
| 3,974,952 | A * | 8/1976 | Swanke et al. | 242/615.3 X |
| 3,986,650 | A * | 10/1976 | Swanke et al. | 226/21 |
| 4,061,222 | A | 12/1977 | Rushing | |
| 4,286,706 | A * | 9/1981 | Castelli et al. | 198/806 |
| 4,429,985 | A * | 2/1984 | Yokota | 399/165 |
| 4,893,740 | A | 1/1990 | Hediger et al. | |
| 4,901,903 | A | 2/1990 | Blanding | |
| 4,961,089 | A | 10/1990 | Jamzadeh | |
| 4,996,563 | A * | 2/1991 | Blanding | 399/165 |
| 5,019,864 | A * | 5/1991 | Blanding | 399/165 |
| 5,225,877 | A * | 7/1993 | Wong | 399/165 X |
| 5,397,043 | A * | 3/1995 | Blanding | 226/21 |
| 5,659,851 | A * | 8/1997 | Moe et al. | 399/165 |
| 6,134,406 | A * | 10/2000 | Moe et al. | 399/165 |
| 6,195,518 | B1 * | 2/2001 | Bennett et al. | 399/165 |

* cited by examiner

*Primary Examiner*—Gene O. Crawford
*Assistant Examiner*—Evan H. Langdon
(74) *Attorney, Agent, or Firm*—Donna P. Sucby

(57) ABSTRACT

A method and apparatus for web tracking adjustment for a web handling system comprises biasing a steering roller in a gimbal direction, and adjusting the bias to achieve the desired tracking.

20 Claims, 2 Drawing Sheets

WEB TRACKING ADJUSTMENT DEVICE AND METHOD THROUGH USE OF A BIASED GIMBAL

BACKGROUND

The present invention is in the field of mechanisms for tracking moving webs. More specifically this invention relates to the tracking method of the film on the film handling system, and a means for adjusting the film tracking, in electrophotographic printers and copiers.

In high speed electrostatographic reproduction apparatus, it is a common practice to employ an elongated photoconductive belt or web adapted to record transferable images while the web is moving in a path in operative relation with various process stations. Typically the web is supported by, and driven about, at least one roller. With a roller support, there is a tendency for the moving web to shift laterally, or cross-track, with respect to such a roller. This tendency can be due to manufacturing tolerances, such as the inability to manufacture perfectly cylindrical rollers, or to exactly mount the rollers in a web supporting system. Various apparatus for correcting such lateral shifting of roller-supported webs are known, such as crowned rollers, flanged rollers, servo-actuated steering rollers, or self-actuating steering rollers. Crowned rollers generally are not suitable for use with a web in an electrostatographic reproduction apparatus, because they force the web toward the apex of such rollers, cause distortion of the web, and produce local stresses in the web at the crown which can damage the web. Flanged rollers generally are also not suitable because they produce a concentrated loading at the edges of the web, resulting in edge buckling, seam splitting, or excessive edge wear.

Electrostatographic reproduction apparatus therefore typically utilize servo-actuated or self-actuated steering rollers. While such steering rollers generally correct in a gross manner the cross-track shifting of the web, they tend to produce significant lateral movement of the web at an uneven rate as it is re-aligned. This can adversely effect the resulting image quality.

Another method for web tracking is disclosed in U.S. Pat. No. 4,901,903 by Blanding, which describes a steering roller mounted on a pivoted yoke, wherein the roller has an edge guide, and an edge guide adjustment mechanism. In this method, a light tension spring applies a force to the yoke to rotate the roller about a caster axis to impede aberrant lateral movement, and provide corrective action should it occur. This method, though useful, takes a fair amount of very limited space. It is also difficult to make fine adjustments to the tracking using the apparatus disclosed in Blanding.

A method and apparatus for web tracking, and web tracking adjustment is desired which is simple, cost effective, can more effectively use the limited space, and which can make fine adjustments.

SUMMARY OF THE INVENTION

A method and apparatus for web tracking adjustment for a web handling system is disclosed, comprising biasing a steering roller in a gimbal direction, and adjusting the bias to achieve the desired tracking.

DETAILED DESCRIPTION

The method and apparatus of the preferred embodiment will be described in accordance with an electrostatographic recording medium. The invention, however, is not limited to methods and apparatus for tracking such a medium, as tracking, and adjustment of the tracking for any web/roller system is within the spirit of the invention.

Figure 1:
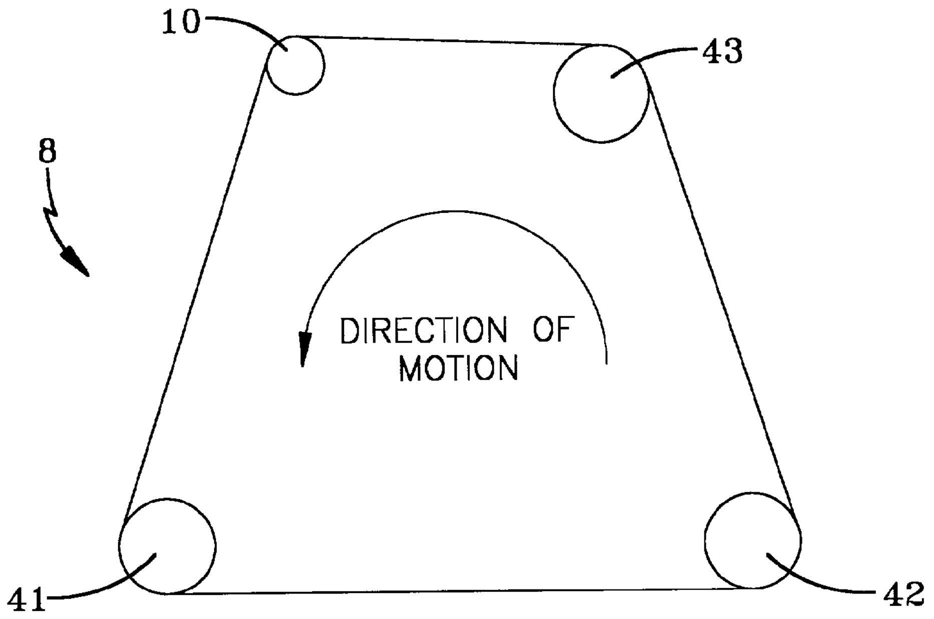
FIG. 1 is a side view of a web/roller system according to an aspect of the invention.
Figure 2:
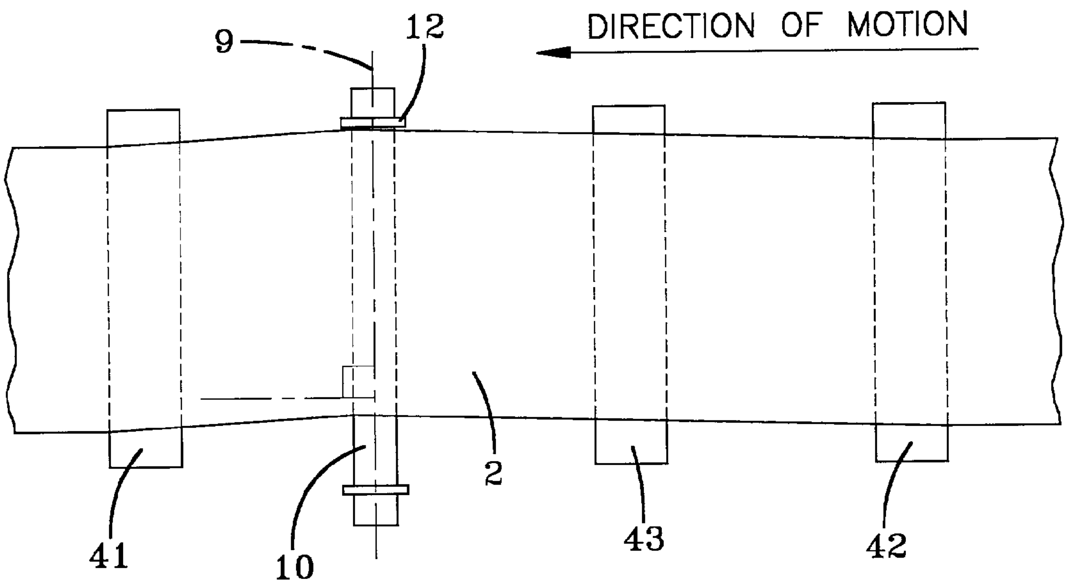
FIG. 2 is a top view of a continuous web/roller system according to an aspect of the invention.
Figure 3:
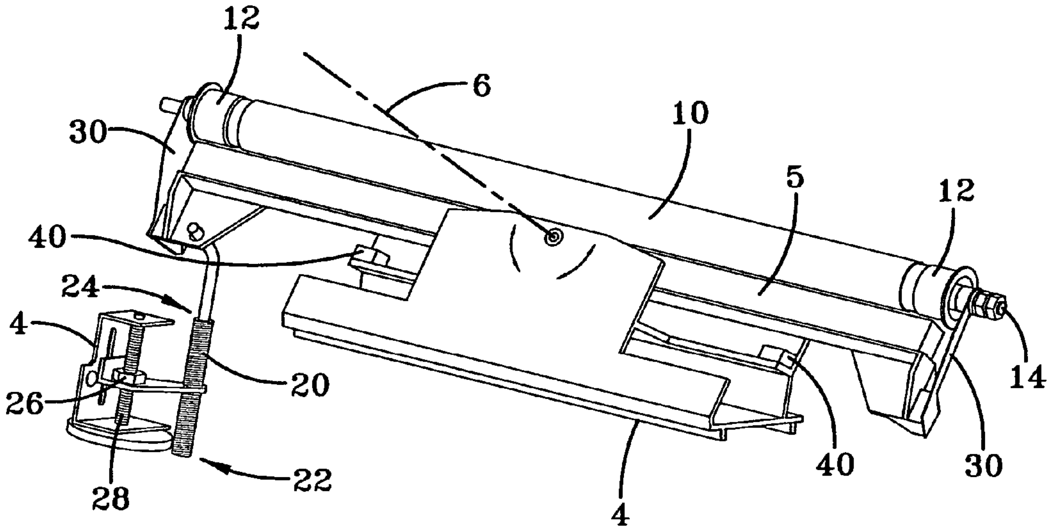
FIG. 3 is an isometric view of a steering roller and biasing apparatus according to an aspect of the invention.
Figure 4:
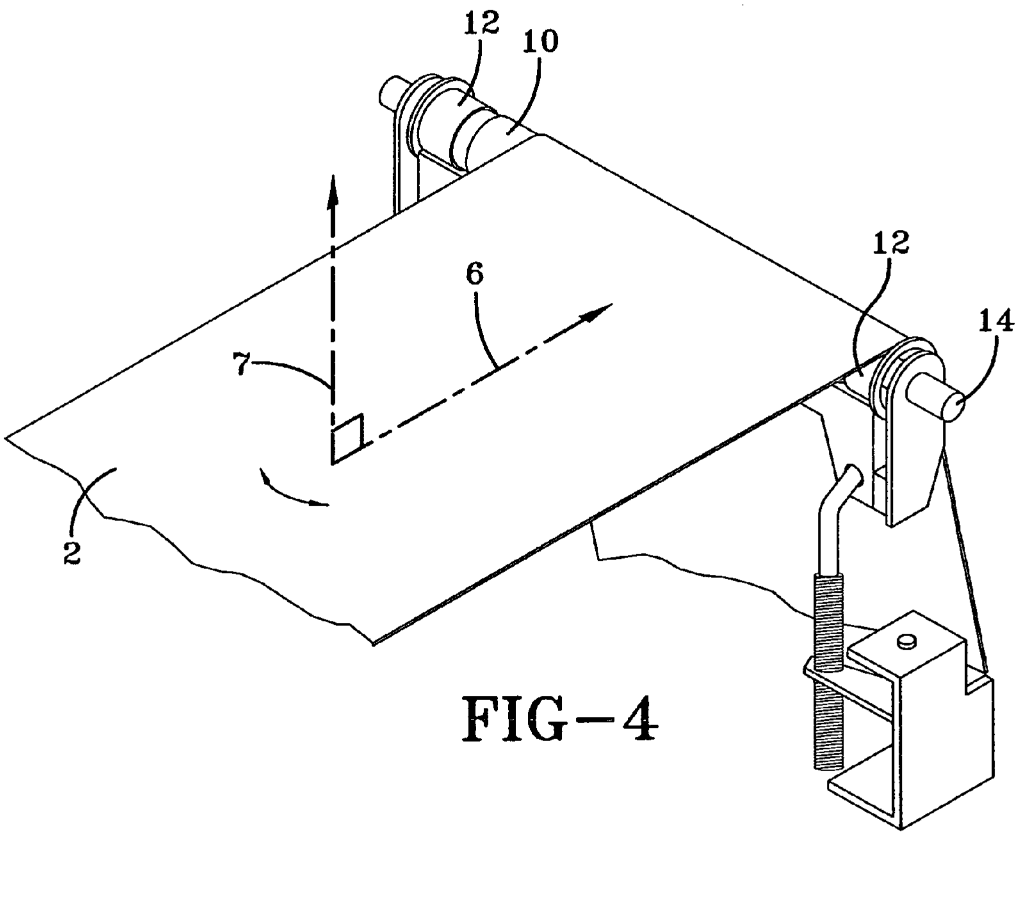
FIG. 4 is an isometric view of a steering roller and biasing apparatus, with a moving web according to an aspect of the invention.

Various aspects of the invention are presented in FIGS. 1-4 which are not drawn to scale and in which like components are numbered alike. Referring now to these Figures, in a closed loop web/roller system 8, at least one steering roller 10 is provided, that is the roller which is free to move in some fashion so as to "steer" the web laterally (parallel to the steering roller 10 longitudinal axis 9) to bring it to the desired position. One way in which a roller may move is by "gimballing" the roller, i.e. by mounting the roller for pivotal movement about a gimbal axis 6 which is parallel to the direction of linear movement of the entering web, and which preferrably intersects the longitudinal axis 9 of the roller at the midpoint of the roller. Due to functional constraints, the steering roller 10 may not be able to pivot exactly about an axis which intersects the longitudinal axis 9 of the steering roller 10 at the midpoint of the steering roller 10, if this is the case then an axis which is parallel to the direction of linear movement of the entering web 2, and comes close to intersecting the steering roller at the midpoint of its longitudinal axis 9 will suffice for the gimbal axis 6. Another way in which a roller may move is by mounting the roller for pivotal movement about a caster axis 7, which is an axis perpendicular to the gimbal axis, which intersects the gimbal axis 6 upstream of the roller. A roller may be both "castered" and "gimbaled", which means that such a roller is able to pivot about both the caster axis 7 and the gimbal axis 6. In the drawings a four roller closed loop system 8 is shown. Besides the steering roller 10 there is also a registration roller 43 and a drive roller 41 which do not steer, and a tension roller 42 which moves in the caster and gimbal direction, and thus allows for some correction of the direction of the web 2. This is just an example of one type of system for which the invention is useful, and does not in any way limit the invention to such a system.

According to an aspect of the invention, a method of web tracking adjustment for guiding a moving web 2 in a predetermined path of travel relative to a stationary frame 4 comprises biasing a steering roller 10 in a gimbal direction, and adjusting the bias to achieve desired tracking. By biasing the steering roller 10 in a gimbal direction it is meant that the steering roller is pivoted about the gimbal axis 6 such that the web 2 on the downstream side of the steering roller 10 is not perpendicular to the longitudinal axis 9 of the steering roller 10. This can be seen in FIG. 2, which is a top view of the web/roller system 8, layed out flat for viewing purposes.

According to a further embodiment of this invention, the steering roller 10 has a lateral constraint 12, and the bias allows the web 2 to ride against the lateral constraint 12 without damaging the web 2. In a preferred embodiment, the steering roller 10 is mounted on a roller shaft 14, and the lateral constraint 12 comprises an edge guide which is rotatably mounted on the roller shaft 14 and is axially slidable relative thereto.

In a further preferred embodiment, the steering roller 10 is biased by a spring 20 having an end one 22 and an end two 24 mounted between the frame 4 and one end of the steering roller 10 such that the spring end one 22 is mounted to the frame 4, and the spring end two 24 is mounted to the steering roller 10, such that the spring 20 applies a rotational force on the steering roller 10 about a gimbal axis 6. This is just one means of biasing the steering roller in the gimbal direction, any suitable means is within the purview of this invention.

According to an aspect of the invention, a means for adjustment is accomplished by applying a pre-load to the spring 20 to achieve the desired tracking. One method for applying this pre-load is by attaching a mounting nut 26 to the spring end one 22, and threading a mounting screw 28 through the frame 4, such that the mounting nut 26 is threaded onto the mounting screw 28 to apply the desired pre-load on said spring. There are many ways to apply pre-loading on a spring, and many means for adjusting the pre-load on a spring other than the method disclosed, all such suitable methods are within the purview of this invention.

According to a further preferred embodiment of the invention, the web tracking apparatus further comprises a housing 5 and spring flexures 30. The housing 5 is pivotally mounted to the frame 4 such that the housing 5 pivots about the gimbal axis 6. The steering roller 10 is mounted on a roller shaft 14, which roller shaft 14 is in turn mounted to the housing 5 by the spring flexures 30, such that the spring flexures 30 allow the steering roller 10 to pivot about the caster axis 7, while the housing 5 allows the steering roller 10 to pivot about the gimbal axis 6.

According to a further aspect of the invention, a stop 40 is used for preventing the steering roller 10 from rotating too far in the gimbal direction.

We claim:

1. A method of web tracking adjustment for guiding a moving web in a predetermined path of travel relative to a stationary frame, comprising:

biasing a steering roller having a roller shaft in a gimbal direction to steer the web laterally; and adjusting said bias to achieve tracking relative to a lateral constraint by applying a force relative to a lateral position on said roller shaft, the lateral constraint axially slidable relative thereto to impede aberrant lateral movement.

2. The method of claim 1 wherein said steering roller has a lateral constraint, and said bias allows the web to ride against said lateral constraint without damaging the web.

3. A method of web tracking adjustment for guiding a moving web in a predetermined path of travel relative to a stationary frame, comprising:

biasing a steering roller in a gimbal direction wherein said bias allows the web to ride against the lateral constraint without damaging the web, and wherein said steering roller is mounted on a roller shaft, and said lateral constraint comprises an edge guide which is rotatably mounted on said roller shaft and is axially slidable relative thereto; and adjusting said bias to achieve tracking relative to a lateral constraint by applying a force relative to a lateral position.

4. A method of web tracking adjustment for guiding a moving web in a predetermined path of travel relative to a stationary frame, comprising:

biasing a steering roller in a gimbal direction wherein said bias allows the web to ride against the lateral constraint without damaging the web, wherein said steering roller is biased by a spring having a first spring end and a second spring end mounted between the frame and one end of said steering roller such that said first spring end is mounted to said frame, and said second spring end is mounted to said steering roller, such that said spring applies a rotational force on said steering roller about a gimbal axis and adjusting said bias to achieve tracking relative to a lateral constraint by applying a force relative to a lateral position.

5. The method of claim 4 wherein said adjustment comprises applying a preload to said spring to achieve tracking relative to a lateral constraint by applying a force relative to a lateral position.

6. The method of claim 5 wherein said spring is mounted to said frame by attaching a mounting nut to said spring first end, and threading a screw through the frame, such that said mounting nut is threaded onto said screw to apply the desired pre-load on said spring.

7. A method of web tracking adjustment for guiding a moving web in a predetermined path of travel relative to a stationary frame, comprising:

biasing a steering roller in a gimbal direction;

adjusting said bias to achieve desired tracking, and further comprising a housing and spring flexures, wherein said housing is pivotally mounted to said frame such that said housing pivots about a gimbal axis, and wherein said steering roller is mounted on a roller shaft, which said shaft is in turn mounted to said housing by said spring flexures, such that said spring flexures allow said steering roller to pivot about a caster axis, while said housing allows said steering roller to pivot about a gimbal axis.

8. The method of claim 1 wherein said steering roller is mounted to said stationary frame in such a manner as to allow said steering roller to pivot about a caster axis.

9. A web tracking apparatus for a guiding a moving web in a predetermined path of travel relative to a stationary frame, comprising:

a gimbaled steering roller, with a roller shaft, having a lateral constraint mounted on said roller shaft and axially slidable relative thereto;

a means for biasing said steering roller in a gimbal direction; and, a means for adjusting said bias to achieve tracking relative to a lateral constraint by applying a force relative to a lateral position.

10. A web tracking apparatus for a guiding a moving web in a predetermined path of travel relative to a stationary frame, comprising:

a gimbaled steering roller having a lateral constraint;

a means for biasing said steering roller in a gimbal direction; and, a means for adjusting said bias to achieve desired tracking, and further comprising a housing and spring flexures, wherein said housing is pivotally mounted to said frame such that said housing pivots about a gimbal axis of said steering roller, and wherein said steering roller is mounted on a roller shaft, which said shaft is in turn mounted to said housing by said spring flexures, such that said spring flexures allow said steering roller to pivot bout a caster axis, while said housing allows said steering roller to pivot about a gimbal axis.

11. A web tracking apparatus for a guiding a moving web in a predetermined path of travel relative to a stationary frame, comprising:

a gimbaled steering roller having a lateral constraint;

a means for biasing said steering roller in a gimbal direction, wherein said means for biasing said steering roller in the gimbal direction comprises a spring having a first spring end and a second spring end mounted between the frame and one end of said steering roller such that said first spring end is mounted to said frame, and said second spring end is mounted to said steering roller, such that said spring applies a rotational force on said steering roller about a gimbal axis; and a means for adjusting said bias to achieve tracking relative to a lateral constraint by applying a force relative to a lateral position.

12. The web tracking apparatus of claim 11 wherein said means for adjusting said bias comprises applying a pre-load to said spring to achieve tracking relative to a lateral constraint by applying a force relative to a lateral position.

13. The web tracking apparatus of claim 12 wherein said spring is mounted to said frame by attaching a mounting nut to said first spring end, and threading a screw through the frame, such that said mounting nut is threaded onto said screw to apply the desired pre-load on said spring.

14. The web tracking apparatus of claim 9 wherein said steering roller is mounted on a roller shaft.

15. A web tracking apparatus for guiding a moving web in a predetermined path of travel relative to a stationary frame, comprising:

a gimbaled steering roller having a lateral constraint wherein said steering roller is mounted on a roller shaft, and wherein said lateral constraint comprises an edge guide which is rotatably mounted on said roller shaft and is axially slidable relative thereto;

a means for biasing said steering roller in a gimbal direction; and, a means for adjusting said bias to achieve tracking relative to a lateral constraint by applying a force relative to a lateral position.

16. The web tracking apparatus of claim 9 further comprising a stop for preventing said steering roller from rotating too far in the gimbal direction.

17. A method of web tracking adjustment for guiding a photoconductor loop in a electrostatographic reproduction apparatus on a predetermined path of travel relative to a stationary frame, comprising:

biasing a steering roller in a gimbal direction; and, adjusting said bias to achieve tracking relative to a lateral constraint by applying a force relative to a lateral position.

18. The method of claim 17 wherein said steering roller has a lateral constraint, and said bias allows the web to ride against said lateral constraint without damaging the web.

19. A method of web tracking adjustment for guiding a photoconductor loop in a electrostatographic reproduction apparatus on a predetermined path of travel relative to a stationary frame, comprising:

biasing a steering roller in a gimbal direction wherein said steering roller has a lateral constraint and said bias allows the web to ride against said lateral constraint without damaging the web, and wherein said steering roller is mounted on a roller shaft, and said lateral constraint comprises an edge guide which is rotatably mounted on a said roller shaft and is axially slidable relative thereto; and adjusting said bias to achieve tracking relative to a lateral constraint by applying a force relative to a lateral position.

20. A method of web tracking adjustment for guiding a photoconductor loop in a electrostatographic reproduction apparatus on a predetermined path of travel relative to a stationary frame, comprising:

biasing a steering roller in a gimbal direction; and, adjusting said bias to achieve desired tracking, and further comprising a housing and spring flexures, wherein said housing is pivotally mounted to said frame such that said housing pivots about a gimbal axis, and wherein said steering roller is mounted on a roller shaft, which said shaft is in turn mounted to said housing by said spring flexures, such that said spring flexures allow said steering roller to pivot about a caster axis, while said housing allows said steering roller to pivot about a gimbal axis.

* * * * *